US009956902B2

(12) United States Patent
Fukayama (10) Patent No.: US 9,956,902 B2
(45) Date of Patent: May 1, 2018

(54) HEADLIGHT CONTROLLER AND VEHICLE HEADLIGHT SYSTEM (71) Applicant: Stanley Electric Co., Ltd., Tokyo (JP)

(72) Inventor: Junichi Fukayama, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days. days.

(21) Appl. No.: 14/340,286

(22) Filed: Jul. 24, 2014

(65) Prior Publication Data

US 2015/0042225 A1 Feb. 12, 2015

(30) Foreign Application Priority Data

Aug. 9, 2013 (JP) ................. 2013-166341

(51) Int. Cl.
B60Q 1/02 (2006.01)
B60Q 1/14 (2006.01)
F21S 8/10 (2006.01)

(52) U.S. Cl.
CPC .......... B60Q 1/143 (2013.01); F21S 48/1154 (2013.01); F21S 48/1747 (2013.01);
(Continued)

(58) Field of Classification Search
CPC .. B60Q 1/1423; B60Q 1/143; B60Q 2300/42; B60Q 2300/112; B60Q 2300/41;
(Continued)

(56) References Cited

U.S. PATENT DOCUMENTS 8,251,560 B2 8/2012 Ohno et al.
8,373,182 B2 2/2013 Seko et al.
(Continued)

FOREIGN PATENT DOCUMENTS

JP 2009123566 A 6/2009
JP 2010-232081 A 10/2010
(Continued)

OTHER PUBLICATIONS

Japanese Office Action for the related Japanese Patent Application No. 2013-166341 dated Apr. 26, 2017.
(Continued)

Primary Examiner — Alexander H Taningco
Assistant Examiner — Christian L Garcia
(74) Attorney, Agent, or Firm — Kenealy Vaidya LLP (57) ABSTRACT A headlight controller and a vehicle headlight system including an ADB can include a headlight controller and an optical unit. The headlight controller can include a system controller and a camera photographing vehicles located in a forward direction thereof, and the system controller can be configured to output a control signal to provide various favorable light distribution patterns by using image data output from the camera in accordance with traffic conditions. The optical unit can be configured to emit beam lights using lights emitted from a first and second light-emitting device via a projector lens so that the beam lights can be used as a high beam and a low beam without movable parts. Thus, the disclosed subject matter can include providing vehicle headlight systems that can form various favorable light distribution patterns by utilizing the characteristics of the controller and the optical unit in accordance with the traffic conditions.

15 Claims, 8 Drawing Sheets (52) U.S. Cl.
CPC ...... *B60Q 1/1423* (2013.01); *B60Q 2300/056* (2013.01); *B60Q 2300/112* (2013.01); *B60Q 2300/122* (2013.01); *B60Q 2300/322* (2013.01); *B60Q 2300/41* (2013.01); *B60Q 2300/42* (2013.01); *F21S 48/1186* (2013.01)

(58) Field of Classification Search
CPC ........ B60Q 2300/054; B60Q 2300/052; B60Q 2300/322; F21S 48/1186; F21S 48/1747; F21S 48/1159
USPC .... 315/82, 77; 362/465, 464, 466, 507, 460, 362/543, 545; 307/10.8
See application file for complete search history.

(56) References Cited

U.S. PATENT DOCUMENTS

| | | | | |
|---|---|---|---|---|
| 2007/0253597 | A1* | 11/2007 | Utida | B60Q 1/085 |
| | | | | 382/104 |
| 2011/0025209 | A1* | 2/2011 | Nakanishi | B60Q 1/12 |
| | | | | 315/82 |
| 2013/0131922 | A1 | 5/2013 | Ogata et al. | |
| 2013/0242100 | A1 | 9/2013 | Seki | |
| 2014/0175978 | A1* | 6/2014 | Kobayashi | B60Q 1/1423 |
| | | | | 315/82 |
| 2015/0149045 | A1* | 5/2015 | Mizuno | B60Q 1/1423 |
| | | | | 701/49 |

FOREIGN PATENT DOCUMENTS

| | | |
|---|---|---|
| JP | 2012-30673 A | 2/2012 |
| JP | 2012030673 A | 2/2012 |
| JP | 2012-151058 A | 8/2012 |
| JP | 2012-162121 A | 8/2012 |
| JP | 2012183874 A | 9/2012 |
| JP | 2013-32121 A | 2/2013 |
| JP | 2013-147111 A | 8/2013 |

OTHER PUBLICATIONS

Japanese Office Action for the related Japanese Patent Application No. 2013-166341 dated Nov. 20, 2017.

* cited by examiner

| Curvature R | First timing factor $\alpha$ | Second timing factor $\beta$ |
|---|---|---|
| R < 1 5 0 | 0.5 | 0.5 |
| R ≧ 1 5 0 | 0.4 | 0.4 |

# HEADLIGHT CONTROLLER AND VEHICLE HEADLIGHT SYSTEM

This application claims the priority benefit under 35 U.S.C. § 119 of Japanese Patent Application No. 2013-166341 filed on Aug. 9, 2013, which is hereby incorporated in its entirety by reference.

BACKGROUND

1. Field

The presently disclosed subject matter relates to headlight controllers and vehicle headlight systems, and more particularly to vehicle headlight systems including the headlight controller and optical unit, which do not include a movable component with a simple structure, and the vehicle headlight systems having a favorable light distribution pattern, which can be easy to drive at night, can prevent the optical unit from emitting a glare type light to oncoming vehicles and vehicles moving forward on a driving lane even when a drive drives on a curved roadway.

2. Description of the Related Art

When drivers steer a car at night, the drivers usually want to steer the car while they turn on headlights for a high beam to improve a visibility. However, drivers must drive the car while they switch between the headlights for a high beam and headlights for a low beam in response to various traffic conditions so that the headlights do not emit a glare type light to oncoming vehicles, vehicles moving forward on a same driving lane, etc.

Hence, vehicle headlight systems including an adaptive driving beam (ADB) have been developed. A vehicle headlight system including an ADB, for example, may contribute an improvement of visibility in a forward direction of the vehicle that has the ADB for a driver by detecting an oncoming vehicle, a forward vehicle and the like with a camera incorporated into the vehicle that has the ADB and by emitting a high beam for the driver on an area except regions where the oncoming vehicle and the forward vehicle move.

A conventional headlight system including an ADB is disclosed in Patent Document No. 1 (Japanese Patent Application Laid Open JP 2010-232081). FIGS. 7a to 7e are schematic side cross-sectional views depicting a respective one of operations in a conventional headlight of a vehicle headlight system including the ADB, which is disclosed in Patent Document No. 1. The conventional headlight 70 includes: a light source 71; a projector lens 72 located in a light-emitting direction of the light source 71: and a rotatable shutter 73 located between the light source 71 and the projector lens 72, wherein the headlight 70 forms various light distribution patterns using light emitted from the light source 71 via the projector lens 72 by rotating the rotatable shutter 73 in response to various traffic conditions.

Figure 8A:
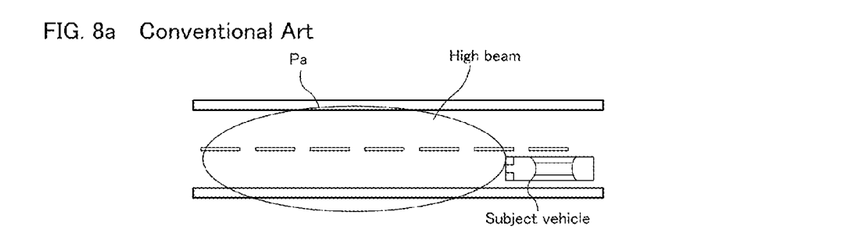
FIG. 8*a* to FIG. 8*e* are top views depicting exemplary schematic light distribution patterns, which are formed by the above-described conventional headlight of the vehicle headlight system used in countries where drivers keep to the left side of the road.

FIG. 8a to FIG. 8e are top views depicting exemplary schematic light distribution patterns, which may be formed by the above-described headlight 70 of the headlight system used in countries where drivers keep to the left side of the road. FIG. 8a shows a light distribution pattern Pa for a high beam, when oncoming vehicles and vehicles moving forward on a same driving lane do not exist in a forward direction of a subject vehicle that has the ADB for a driver. In this case, the driver of the subject vehicle may drive on the driving lane while the driver keeps a wide view under the light distribution pattern Pa for a high beam by the headlight 70 shown in FIG. 7a.

Figure 7A:
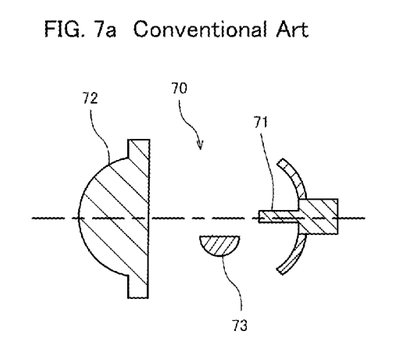
FIG. 7*a* to FIG. 7*e* are schematic side cross-sectional views depicting a respective one of operations in a conventional headlight of a vehicle headlight system including an adaptive driving beam (ADB), respectively.
Figure 7B:
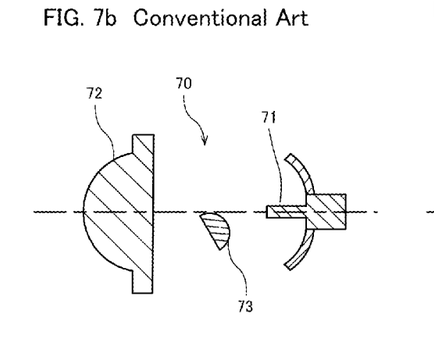
Figure 7C:
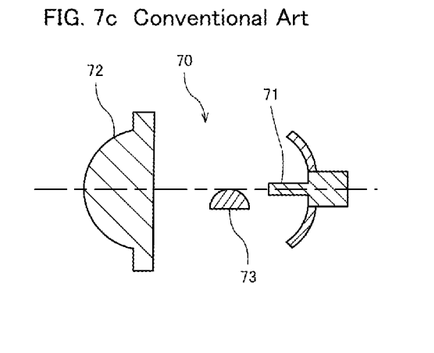
Figure 7D:
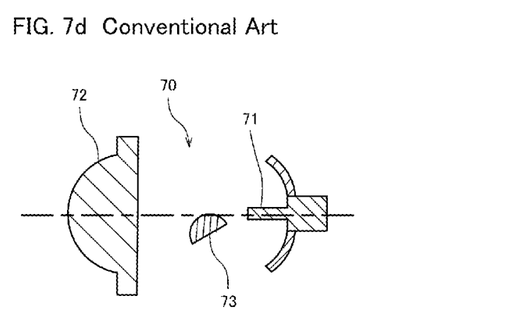
Figure 8B:
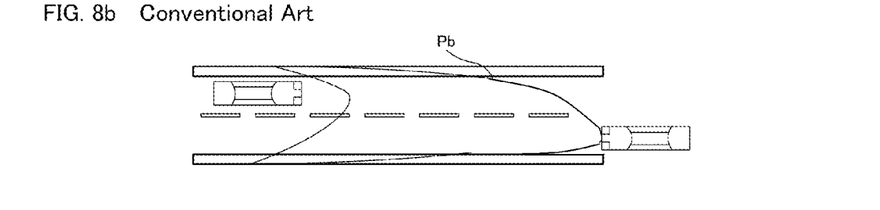

FIG. 8b shows a light distribution pattern Pb for a high beam, when an oncoming vehicle approaches on an oncoming lane in a direction toward the subject vehicle from a long distance. In this case, by rotating the rotatable shutter 73 in the headlight 70 as shown in FIG. 7b, the subject vehicle may drive on the driving lane under the light distribution pattern Pb for a high beam so as not to emit a glare type light to the oncoming vehicle while the driver keeps a wide view under the light distribution pattern Pb for a high beam.

Figure 8C:
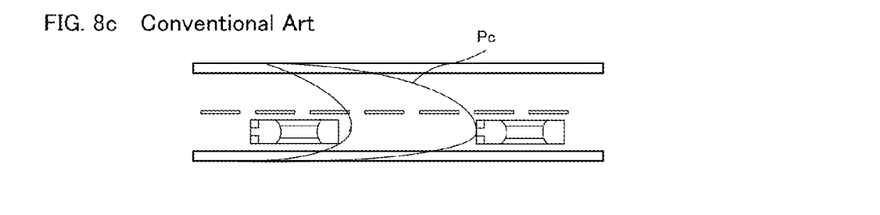

FIG. 8c shows a light distribution pattern Pc for a high beam, when a forward vehicle drives forward on the same driving lane in a forward direction of the subject vehicle from a medium distance. In this case, the subject vehicle may drive on the same driving lane under the light distribution pattern Pc for a high beam so as not to emit a glare type light to the forward vehicle while the driver keeps a wide view under the light distribution pattern Pc for a high beam by rotating the rotatable shutter 73 of the headlight 70 shown in FIG. 7c.

Figure 8D:
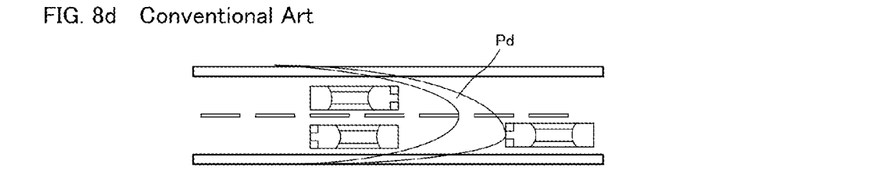

FIG. 8d shows a light distribution pattern Pd for a high beam, when a forward vehicle drives forward on the same driving lane in a forward direction of the subject vehicle from a medium distance and when an oncoming vehicle approaches on the oncoming lane in a direction toward the subject vehicle from a medium distance. In this case, the subject vehicle may drive on the same driving lane under the light distribution pattern Pd for a high beam so as not to emit a glare type light to the forward vehicle and the oncoming vehicle by using the headlight 7d shown in FIG. 7d.

Figure 7E:
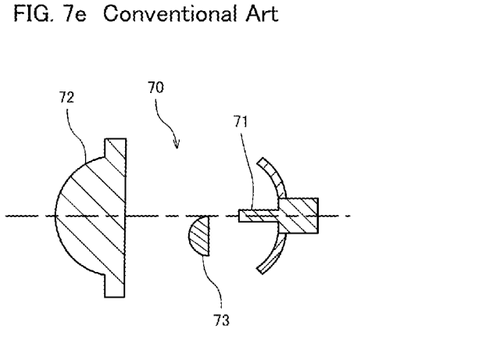
Figure 8E:
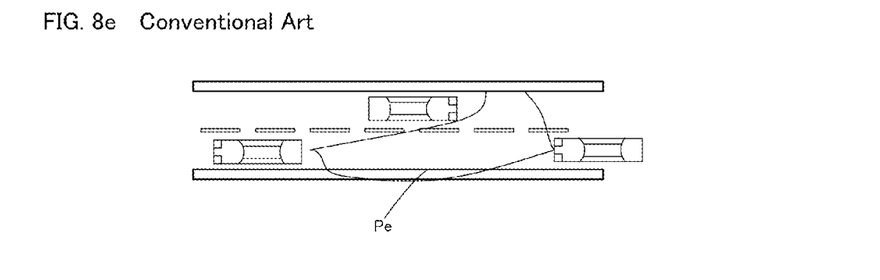

Next, when an oncoming vehicle approaches on the oncoming lane in a direction toward the subject vehicle from a medium distance and when a forward vehicle drives forward on the same driving lane in a forward direction of the subject vehicle from a medium distance, as shown in FIG. 8e, the subject vehicle, which has the ADS for a driver, may provide a light distribution pattern Pe for a low beam so as not to emit a glare type light to the oncoming vehicle and the forward vehicle by the headlight 70 for a low beam shown in FIG. 7e, in which a substantially upward light is shaded by the rotatable shutter 73 while a downward light passes through the projector lens 72.

Accordingly, the conventional headlight system including the ADB can provide favorable light distribution patterns using light emitted from the light source 71 via the projector lens 72 by rotating the rotatable shutter 73 in response to various traffic conditions so as not to emit a glare type light to the oncoming vehicle and the forward vehicle, while keeping a wide view for safe driving. However, when the conventional headlight system varies from one of the above-described light distribution patterns to another one, a variation from the one of the light distribution patterns to the other one may carried out at once. Therefore, said rapid variation of a light-emitting intensity may cause an uncomfortable feeling to drivers for the oncoming vehicle, the forward vehicle and the subject vehicle, and also may cause frights to pedestrians.

In order to improve the uncomfortable feeling as described above, a conventional shade control unit is disclosed in Patent Document No. 2 (Japanese Patent Application Laid Open JP 2012-151058), in which a shade performs a role similar to the rotatable shutter of the above-described conventional headlight system including the ADB. According to the conventional shade control unit, when a conventional headlight system using the shade control unit varies from one of light distribution patterns to another one,
} a rapid variation of a light-emitting intensity may be inhibited by prolonging a time of the rapid variation of the light-emitting intensity.

However, when a subject vehicle having the conventional headlight system using the shade control unit drives, for example, on a curved road and when an oncoming vehicle approaches on an oncoming lane toward the subject vehicle driving on the driving lane, a time while the conventional headlight system changes from a high beam to a light distribution pattern to prevent an emission on an existing region of the oncoming vehicle after detecting the oncoming vehicle may be also subject to a long time.

Consequently, when the subject vehicle drives on a curved road and when an oncoming vehicle approaches on an oncoming lane toward the subject vehicle driving on the curved road, the conventional headlight system using the shade control unit incorporated into the subject vehicle may emit a glare type light to the oncoming vehicle because a long switching time. Especially, the conventional headlight system may have a high chance of an emission of the glare type light to the oncoming vehicle because a relative speed between the subject vehicle and the oncoming vehicle may become fast as compared with a forward vehicle moving forward in a forward direction of the subject vehicle.

In addition, a time while the conventional headlight system varies from the light distribution pattern to a high beam light distribution pattern to emit light on the above-described gone region of the oncoming vehicle after the oncoming vehicle passes through the subject vehicle may be also subject to a long time. Accordingly, a forward visibility of the subject vehicle may reduce during the time while the conventional headlight system varies from the light distribution pattern to the high beam light distribution pattern to emit light on the gone region of the oncoming vehicle.

Moreover, because the conventional headlight systems including the above-described ADB include at least one of the movable parts in a headlight, the headlight systems should become a complex structure. Therefore, the headlight systems may only be incorporated in limited vehicles, because the headlight used for the headlight systems may become big and also may decrease the possibility of car design.

The above-referenced Patent Documents and additional Patent Documents are listed below and are hereby incorporated with their English abstracts and specification in their entireties.
1. Patent Document No. 1: Japanese Patent Application Laid Open JP 2010-232081
2. Patent Document No. 2: Japanese Patent Application Laid Open JP 2012-151058
3. Patent Document No. 3: U.S. Pat. No. 8,373,182
4. Patent Document No. 4: U.S. Patent Publication No. 2013-0242100-A1
5. Patent Document No. 5: U.S. Pat. No. 8,251,560

The disclosed subject matter has been devised to consider the above and other problems, characteristics and features. Thus, exemplary embodiments of the disclosed subject matter can include headlight controllers which can provide a favorable light distribution pattern to safely drive at night in accordance with various traffic conditions, while preventing a right and left headlight from emitting a glare type light to oncoming vehicles and vehicles moving in a forward direction of a subject vehicle, even when the subject vehicle drives on a big curved road, and even when an oncoming vehicle approaches on an oncoming lane toward the subject vehicle and also passes through the subject vehicle.

In addition, exemplary embodiments of the disclosed subject matter can include vehicle headlight systems including an optical unit with a simple structure, which can be used as the right and left headlight for the above-described headlight controller. The optical unit does not include movable parts such as the conventional headlight, and therefore can expand possibilities for design so as to be able to harmonize with various vehicular designs.

SUMMARY

The presently disclosed subject matter has been devised in view of the above and other characteristics, desires, and problems in the conventional art. An aspect of the disclosed subject matter can include headlight controllers that can output light distribution data to provide a favorable light distribution pattern to safely drive at night in accordance with various traffic conditions. The headlight controller can prevent a right and left headlight from emitting a glare type light to oncoming vehicles and vehicles moving forward on a driving lane of a subject vehicle under the various traffic conditions. Another aspect of the disclosed subject matter can include providing vehicle headlight systems including the headlight controller and an optical unit, which can be used as a right and left headlight having a high reliability for the headlight controller, and which can be easy to reduce a size of the headlight due to no movable part. The vehicle headlight systems can provide a favorable light distribution pattern that can be easy to drive at night for not only the subject vehicle but also vehicles traveling near the subject vehicle by utilizing the characteristics of the headlight controller and the optical unit.

According to an aspect of the disclosed subject matter, a headlight controller including an ADB can include: a camera located adjacent a subject vehicle having a right and left headlight, configured to photograph at least one vehicle located in a forward direction of the subject vehicle, and being configured to output the at least one vehicle photographed by the camera as image data; a vehicle detector detecting the at least one vehicle in accordance with the image data output from the camera, detecting locating data of the at least one vehicle with respect to an optical axis of the camera, and being configured to output said vehicle data as a first vehicle data; an oncoming vehicle detector configured to judge whether the vehicle is an oncoming vehicle or not in accordance with the first vehicle data, and configured to output said vehicle data as a second vehicle data; and a circling detector configured to calculate a curvature of a road, on which the subject vehicle drives, by using a vehicle speed signal and a rudder angle signal output from the subject vehicle, configured to judge whether the road is a curved road or a substantially straight road in accordance with the curvature of the road, and configured to output said road data as a vehicle road data.

In addition, the headlight controller including an ADB can also include: a timing controller configured to store a normal time at a first timing factor and a second timing factor when the road is a substantially straight road in accordance with the vehicle road data and when the vehicle is not an oncoming vehicle in accordance with the second vehicle data, configured to store a prescribed time at the first timing factor and the second timing factor when the road is a curved road in accordance with the vehicle road data and when the vehicle is an oncoming vehicle in accordance with the second vehicle data, and configured to output the first timing factor and the second timing factor; a light-emitting area controller configured to output a light-emitting area data every time the light-emitting area controller detects that the at least one vehicle moves in accordance with the first vehicle data; a light distribution controller configured to receive the light-emitting area data, the first timing factor and the second timing factor, and configured to output a light-emitting control signal to the right and left headlight in accordance with the light-emitting area data output, the first timing factor and the second timing factor; and wherein the first timing factor is a time while the right and left headlight changes from a non-light-emitting area to a light-emitting area when varying a light distribution pattern and the second timing factor is a time while the right and left headlight changes from a light-emitting area to a non-light-emitting area when varying a light distribution pattern.

In the above-described exemplary headlight controllers, the normal time can be longer time than the prescribed time, which is stored at the first timing factor and the second timing factor, the first timing factor and the second timing factor can be a substantially same time, and also at least one of the first timing factor and the second timing factor can be set up at a plurality of different times as the prescribed time except the normal time. Additionally, the camera can be a color camera, which photographs color image data, and the oncoming vehicle detector can be configured to judge that the vehicle is an oncoming vehicle by extracting a headlight of the oncoming from the first vehicle data output from the vehicle detector. The circling detector can judge that the road, on which the subject vehicle drives, is a curved road, when the curvature of the road is 150 or more.

According to another aspect of the disclosed subject matter, vehicle headlight systems including an ADB can replace the right and left headlight of the headlight controllers described above with a right and left optical unit. Each of the right and left optical unit can include at least one of a first light-emitting device having a first light-emitting surface for a low beam and a second light-emitting device having a second light-emitting surface for a high beam, and an LED drive circuit emitting at least one of the first light-emitting device and the second light-emitting device. In this case, the first timing factor can be a time while each of the right and left optical unit of the object vehicle changes from a non-light-emitting surface of the second light-emitting surface of the second light-emitting device to a light-emitting surface and the second timing factor can be a time while each of the right and left optical unit of the object vehicle changes from a light-emitting surface of the second light-emitting surface of the second light-emitting device to a non-light-emitting surface.

In the above-described exemplary vehicle headlight systems including an ADB, the vehicle headlight systems further can include a first projector lens located in front of the first light-emitting surface of the first light-emitting device so that an optical axis of the first projector lens intersects with the first light-emitting surface of the first light-emitting device, and a second projector lens located in front of the second light-emitting surface of the second light-emitting device so that an optical axis of the second projector lens intersects with the second light-emitting surface of the second light-emitting device. The first light-emitting device can include at least one white LED aligning in a substantially horizontal direction with reference to the road, on which the subject vehicle drives, and the second light-emitting device can include a plurality of white LEDs arranged in a matrix array shape in a substantially horizontal direction with reference to the road. In this case, the first light-emitting device can be integrated into the second light-emitting device, and thereby each of the right and left optical unit can include only the second light-emitting device without the first light-emitting device.

According to the aspects, the light-emitting area controller can be configured to output the light-emitting area data every time the light-emitting area controller detects that the at least one vehicle moves in accordance with the first vehicle data output from the vehicle detector, and the timing controller can be configured to output the first timing factor and the second timing factor associating with the light-emitting area data to the light distribution controller in accordance with various traffic conditions. Therefore, the disclosed subject matter can provide the headlight controllers that can form a favorable light distribution pattern to safely drive at night in accordance with various traffic conditions while preventing the right and left headlight from emitting a glare type light to oncoming vehicles and vehicles moving forward on a driving lane of the subject vehicle under the various traffic conditions.

Furthermore, the optical units of the headlight system can be used as the right and left headlight having a high reliability with a simple structure without a movable part for the headlight controllers. Thus, the disclosed subject matter can also provide vehicle headlight systems using the headlight controller and the optical units, which can provide a favorable light distribution pattern that can be easy to drive at night for the subject vehicle and other vehicles traveling near the subject vehicle by utilizing the characteristics of the headlight controller and the optical unit.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
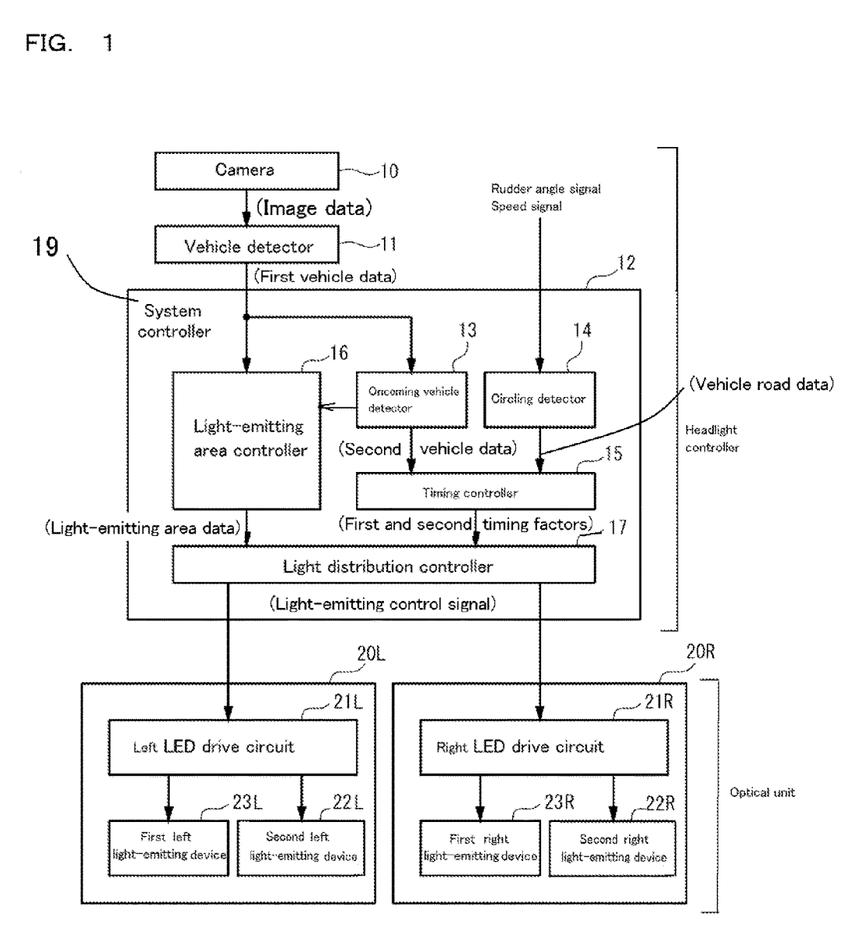
FIG. 1 is a block diagram showing an exemplary embodiment of a vehicle headlight system including a headlight controller and a right and left optical unit made in accordance with principles of the disclosed subject matter.

The disclosed subject matter will now be described in detail with reference to FIG. 1 to FIG. 6b. FIG. 1 is a block diagram showing an exemplary embodiment of a vehicle headlight system including a headlight controller and a right and left optical unit made in accordance with principles of the disclosed subject matter. The vehicle headlight system can include the headlight controller and the right and left optical unit 20R and 20L, which can be used as a right and left headlight for a subject vehicle incorporating the headlight controller.

The headlight controller can include: a camera 10 having an optical axis CA (as described with reference to FIG. 6A later) located at a predetermined position in a forward direction of the subject vehicle (e.g., close to a vehicle interior mirror), photographing an objective space in the forward direction of the subject vehicle, configured to photograph at least one vehicle located in the forward direction of the subject vehicle, and the camera 10 configured to output the at least one vehicle photographed by the camera 10 as image data; a vehicle detector 11 detecting the at least one vehicle in accordance with the image data output from the camera 10, detecting locating data of the at least one vehicle with respect to the optical axis CA of the camera 10, and being configured to output said vehicle data as first vehicle data; and a system controller 19 configured to receive the first vehicle data output from the vehicle detector 11, configured to receive a speed signal and a rudder angle signal output from the subject vehicle, and being configured to output a light-emitting control signal to the right and left optical unit 20R and 20L, which can be used as a right and left headlight for a subject vehicle incorporating the headlight controller.

The system controller 19 can includes: an oncoming vehicle detector 13 detecting second vehicle data of whether the at least one vehicle is an oncoming car or not in accordance with the first vehicle data output from the vehicle detector 11, and outputting the second vehicle data; a circling detector 14 detecting whether the object vehicle drives on a curved road or not in accordance with the speed signal and the rudder angle signal output from the subject vehicle, and outputting said data as a vehicle road data; a timing controller 15 setting up a first timing factor α and a second timing factor β (as described with reference to FIG. 4 later) when the oncoming vehicle detector 13 detects that the at least one vehicle is an oncoming car and when the circling detector 14 detects that the object vehicle drives on a curved road, and outputting the first timing factor α and the second timing factor β; a light-emitting area controller 16 determining a light-emitting area data including a light-emitting area and a non-light-emitting area in accordance with the first vehicle data output from the vehicle detector 11 and the second vehicle data output from the oncoming vehicle detector 13 when the light-emitting area controller 16 confirms the light-emitting area data based upon the second vehicle data; and a light distribution controller 17 configured to receive the light-emitting area data output from the light-emitting area controller 16, configured to receive the first timing factor α and the second timing factor β output from the timing controller 15, and being configure to output the light-emitting control signal to the optical unit 20R and 20L.

Next, the exemplary system structure of the disclosed subject matter and each operation of above-described elements will be described in more detail. As the camera 10, a charge coupled device (CCD) camera in which CCDs are arranged in a matrix array shape, a complementary metal-oxide semiconductor (CMOS) in which CMOSs are arranged in a matrix array shape and the like can be used to photograph the objective space in the forward direction of the subject vehicle. These cameras are generally provided with a projector lens to focus the objective space on each of the CCDs and the CMOSs and to protect each of the CCDs and the CMOSs from an external environment. The optical axis CA of the camera 10 can correspond to an optical axis of the projector lens.

The vehicle detector 11 can include a computer system include a central processing unit (CPU), a read-only memory (ROM), a random access memory (RAM) and the like, and can be operated to extract the at least one vehicle included in the image data output from the camera 10 by running a program from the ROM while using the camera 10. In this case, the vehicle detector 11 can detect only the at least one vehicle by a geometric feature extraction and the like, and then can also detect at least one of a headlight, a taillight, s stop lamp, a position lamp and the like as one of the first vehicle data in the at least one vehicle by an optical feature extraction, etc. Thereby, the vehicle detector 11 can keep detect locating data of the at least one vehicle with respect to the optical axis CA of the camera 10 as another one of the first vehicle data. The vehicle detector 11 can be integrated into the camera 10, and also can be integrated into the system controller 19, which will now be described.

The system controller 19 can also include a computer system include a central processing unit (CPU), a read-only memory (ROM), a random access memory (RAM) and the like, and can be operated as a controller for the optical unit 20R and 20L by running a program from the ROM while operating the camera 10 and the vehicle detector 11.

The oncoming vehicle detector 13 of the system controller 19 can detect the second vehicle data of whether the at least one vehicle is an oncoming car or not in accordance with the first vehicle data output from the vehicle detector 11, and can output the second vehicle data to the timing controller 15. The at least one vehicle means oncoming vehicles and forward vehicles driving forward in a forward direction of the subject vehicle incorporating the vehicle headlight system on a same driving lane. In this case, the oncoming vehicle detector 13 can detect an oncoming vehicle by recognizing at least one of a headlight and a position lamp, and also can detect a forward vehicle driving forward in a forward direction of the subject vehicle by extracting at least one of a taillight and a stop lamp.

When a color camera (e.g., CCD camera including a color filter) is used as the camera 10, the oncoming vehicle detector 13 may be easy to detect whether the at least one vehicle is an oncoming vehicle or not because a taillight and a stop lamp emit red color light and a headlight and a position lamp emit light having a substantially white color tone. Additionally, an oncoming vehicle has features such that may approach toward the subject vehicle on an oncoming lane located adjacent a driving lane, and such that an approaching speed should be fast as compared with a forward vehicle driving forward on a same driving lane, on which the subject vehicle drives.

On the other hand, the forward vehicle driving forward on the same driving lane may have features such that an amount of movements in a horizontal direction with respect to the driving lane may be small and such that an approaching speed between the forward vehicle and the subject matter should be very slow as compared with the oncoming vehicle. Accordingly, the oncoming vehicle detector 13 may be easy to detect whether the at least one vehicle is an oncoming vehicle or not by using a plurality of the above-described features.

The circling detector 14 can be configured to calculate a curvature of a road, on which the subject vehicle drives, by using at least the vehicle speed signal and the rudder angle signal output from the subject vehicle. The circling detector 14 can be configured to detect whether the road, on which the subject vehicle drives, is a curved road or a straight road in accordance with the curvature of the road as a vehicle road data, and can output the road data to the timing controller 15, as shown in FIG. 1.

The timing controller 15 can be configured to set up the first timing factor α and the second timing factor β when the oncoming vehicle detector 13 detects that the at least one vehicle is an oncoming car and when the circling detector 14 detects that the object vehicle drives on a curved road as described above. The first timing factor α can be a time while at least one LED in LEDs incorporated into a first left light-emitting device 23L, a second left light-emitting device 22L, a first right light-emitting device 23R and a second right light-emitting device 22R turns on from a turning-off state of the at least one LED, and the second timing factor β can be a time while at least one LED in the LEDs incorporated into the first left light-emitting device 23L, the second left light-emitting device 22L, the first right light-emitting device 23R and the second right light-emitting device 22R turns off from a turning-on state of the at least one LED.

When the oncoming vehicle detector 13 does not detect that the at least one vehicle is an oncoming car and when the circling detector 14 does not detect that the object vehicle drives on a curved road, each of the first timing factor α and the second timing factor β can set up a normal time Td. When the oncoming vehicle detector 13 detects that the at least one vehicle is an oncoming car and when the circling detector 14 detects that the object vehicle drives on a curved road, each of the first timing factor α and the second timing factor β can set up a shorter time than the normal time Td. The timing controller 15 can output the first timing factor α and the second timing factor β to the light distribution controller 17 after the timing controller 15 sets up the first timing factor α and the second timing factor β in accordance with the above-described procedure. The specific procedure will be described with reference to FIG. 4 later.

The light-emitting area controller 16 can be configured to determine the light-emitting data including a light-emitting area and a non-light-emitting area in accordance with the first vehicle data output from the vehicle detector 11 and/or the second vehicle data output from the oncoming vehicle detector 13. The light-emitting area controller 16 can output the light-emitting data to the light distribution controller 17.

The light distribution controller 17 can be configure to output the light-emitting control signal to the optical unit 20R and 20L in accordance with the light-emitting data output from the light-emitting area controller 16 and the first timing factor α and the second timing factor β output from the timing controller 15. As a right LED drive circuit 21R and a left drive circuit 21L, available LED driver ICs can be used to match the number of LED, a structure, a specification and the like of each of the first and second right light-emitting device 23R and 22R, which is attached to a front right portion of the subject vehicle as a right headlight, and the first and second left light-emitting device 23L and 22L, which is attached to a front left portion of the subject vehicle as a left headlight.

Figure 2:
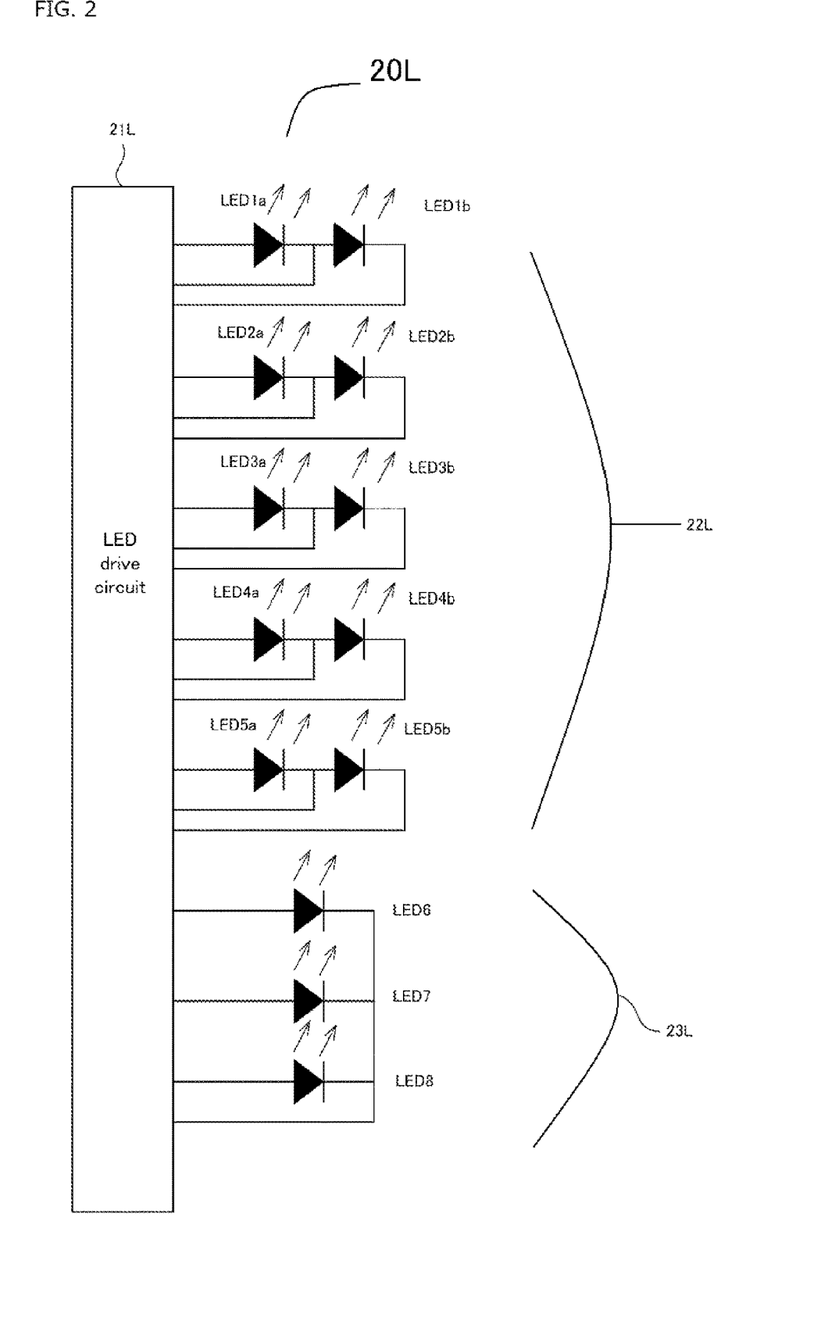
FIG. 2 is a circuit diagram showing an exemplary left optical unit including a first left light-emitting device, a second left light-emitting device and a left LED drive circuit in the vehicle headlight system shown in FIG. 1.

FIG. 2 is a circuit diagram showing an exemplary left optical unit 20L including the first left light-emitting device 23L, the second left light-emitting device 22L and the left LED drive circuit 21L in the vehicle headlight system shown in FIG. 1. The right optical unit 20R is abbreviated in FIG. 2 because it is a substantially same structure as the left optical unit 20L, and the left optical unit 20L will now be described in detail. The first left light-emitting device 23L can include a single LED having a substantially white color tone to be used as a low beam for a right headlight, and also include a plurality of white LEDs having a substantially same white color tone, which align in a horizontal direction with respect to a road. For example, the first left light-emitting device 23L can include three white LEDs LED6, LED7 and LED8, which can be independently drown by the left LED drive circuit 21L, respectively.

The second left light-emitting device 22L can include a plurality of white LEDs having a substantially same white color tone, which are arranged in a matrix array shape and in a horizontal direction with respect to a road in order to be used as a high beam for a left headlight. For example, the second left light-emitting device 22L can include ten white LEDs LED1$a$ to LED5$b$, which are arranged in two rows and five columns, and which can be independently drown by the left LED drive circuit 21L, respectively. As LED1$a$ to LED8, a semiconductor light-emitting device such that is disclosed in Patent Document No. 3 can be used.

Figure 3A:
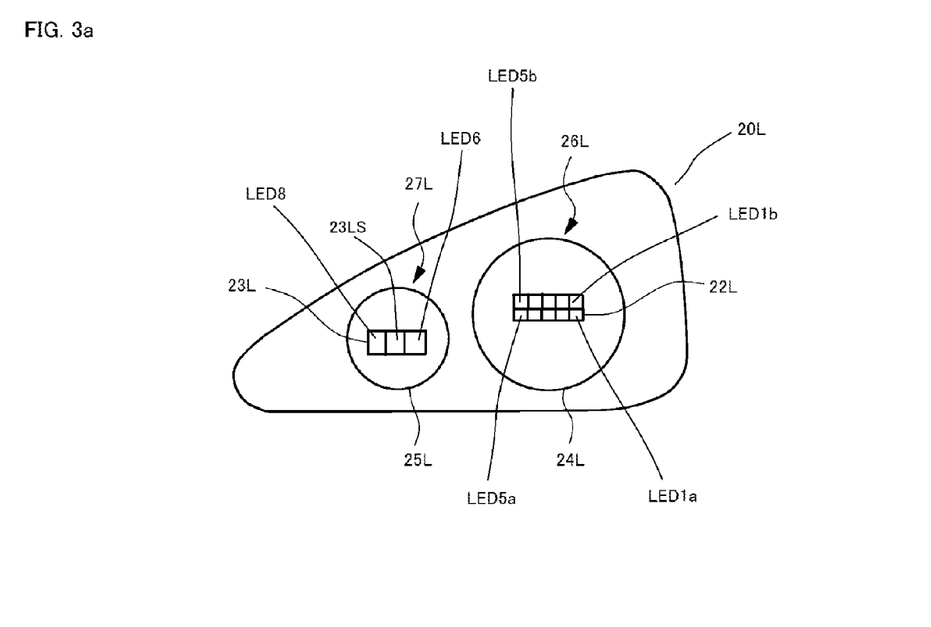
FIG. 3*a* is a schematic front view depicting the left optical unit.

FIG. 3$a$ is a schematic front view depicting the left optical unit 20L including a left low beam optical unit 27L used as a low beam and a left high beam optical unit 26L used as a high beam. The plurality of white LEDs having a substantially same white color tone LED6 to LED8 of the first left light-emitting device 23L can align in a substantially horizontal direction with respect to a road so that the left low beam optical unit 27L can provide a light distribution pattern used as a low beam.

In addition, each of LED1$a$ to LED5$a$ and LED1$b$ to LED5$b$ arranged in two rows and five columns can also align in a substantially horizontal direction with respect to a road. Thereby, the right and left optical unit 20R and 20L can provide favorable light distribution patterns in accordance with various traffic conditions by using the light-emitting control signal output from the light distribution controller 17, which can receive the light-emitting area data output from the light-emitting area controller 16 and the first timing factor α and the second timing factor β output from the timing controller 15.

Figure 3B:
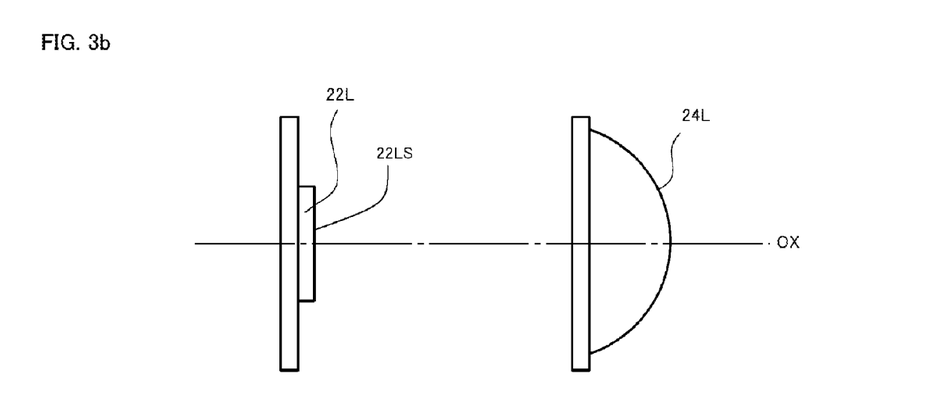
FIG. 3*b* is a schematic side cross-sectional view showing a locating relation between a second left light-emitting device and a second left projector lens in the left optical unit shown in FIG. 3*a*.

FIG. 3$b$ is a schematic side cross-sectional views showing a locating relation between the second left light-emitting device 22L and a second left projector lens 24L having an optical axis OX in the left high beam optical unit 26L. The left high beam optical unit 26L can include the second left projector lens 24L and the second left light-emitting device 22L located in front of the projector lens 24 so that a light-emitting surface 22LS of the second left light-emitting device 22L faces an incident surface of the projector lens 24L and the optical axis OX of the second left projector lens 24L intersects with the light-emitting surface 22LS of the second left light-emitting device 22L.

When each of LED1$a$ to LED5$b$ arranged in two rows and five columns is the semiconductor light-emitting device disclosed in Patent Document No. 3, because a reflective material surrounds a light-emitting surface of the semiconductor light-emitting device, the left high beam optical unit 26L can prevent each of LED1a to LED5b from an optical interference between the adjacent LEDs. Accordingly, the right and left optical unit 20R and 20L can provide favorable light distribution patterns having a clear boundary for a safe driving in accordance with various traffic conditions by using the light-emitting control signal output from the light distribution controller 17.

Similarly, the left low beam optical unit 27L can also include a first left projector lens 25L and the first left light-emitting device 23L located in front of the first left projector lens 25L so that a light-emitting surface 23LS of the first left light-emitting device 23L faces an incident surface of the first left projector lens 25L and an optical axis of the first left projector lens 25L intersects with the light-emitting surface 23LS of the first left light-emitting device 23L. Thereby, the right and left optical unit 20R and 20L can provide favorable light distribution patterns for a low beam, and also can provide favorable light distribution patterns having a clear boundary to drive safely in accordance with various traffic conditions while the first left projector lens 25L associates with the left high beam optical unit 26L.

In this case, the first left light-emitting device 23L can be integrated into the second left light-emitting device 22L so as to be aligned with the second left light-emitting device 22L in a substantially horizontal direction with reference to a road, on which the subject vehicle drives. Thereby, the right and left optical unit 20R and 20L can provide various favorable light distribution patterns including a light distribution pattern for a low beam in accordance with various traffic conditions by using the light-emitting control signal output from the light distribution controller 17, as disclosed in Patent Document No. 4 by Applicant of this disclosed subject matter. Additionally, as the right and left optical unit 20R and 20L, a vehicle headlight using a semiconductor light source and a mirror, which can provide various light distribution patterns disclosed in Patent Document No. 5 by Applicant of this disclosed subject matter, can also be used.

Figure 4:
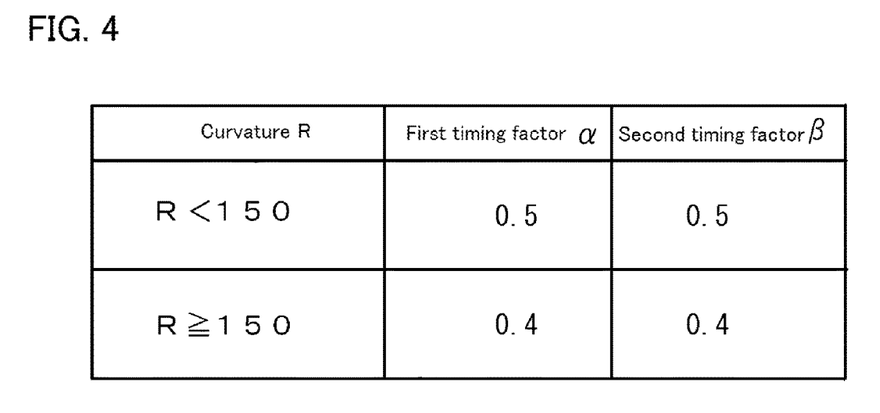
FIG. 4 is a table showing an exemplary first timing factor $\rho$ and an exemplary second timing factor $\beta$ with respect to Curvature R of a curved road, on which a subject vehicle drives.

FIG. 4 is a table showing an exemplary first timing factor $\rho$ and an exemplary second timing factor $\beta$ with respect to Curvature R of a curved road, on which a subject vehicle drives. When the curvature R is less than 150 and when the curvature R is more than 0, each of the first timing factor $\alpha$ and the second timing factor $\beta$ can set up 0.5 as the normal time Td, because a road, on which the subject vehicle drives, may be regarded as a substantially straight road due to a small curvature. When the curvature R is 150 or more, each of the first timing factor $\alpha$ and the second timing factor $\beta$ can set up 0.4 because the road may be regarded as a curved road due to a large curvature.

Thereby, when the oncoming vehicle detector 13 detects that the at least one vehicle is an oncoming car and when the circling detector 14 detects that the object vehicle drives on a curved road, because each of the first timing factor $\alpha$ and the second timing factor $\beta$ can set up a shorter time than the normal time Td, each of the time while at least one LED in LEDs incorporated into a first left light-emitting device 23L, a second left light-emitting device 22L, a first right light-emitting device 23R and a second right light-emitting device 22R turns on from a turning-off state of the at least one LED, and the time while at least one LED in the LEDs turns off from a turning-on state of the at least one LED can become shorter than those of when the oncoming vehicle detector 13 does not detect that the vehicle is an oncoming car and when the circling detector 14 detects that the object vehicle drives on a straight road.

Figure 5:
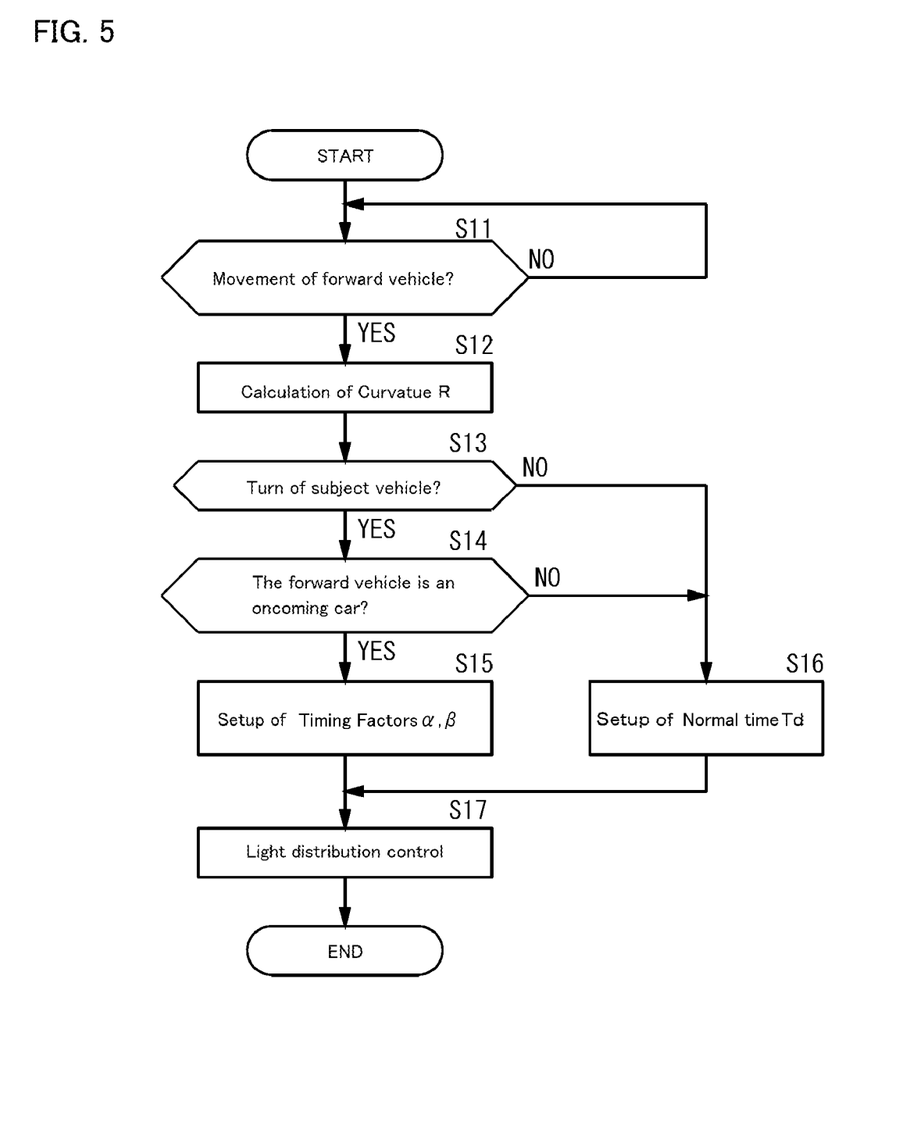
FIG. 5 is a flow chart showing an exemplary operating procedure for the vehicle headlight system shown in FIG. 1.

Here, a basic operation of the vehicle headlight system including the ADB will be described with reference to a schematic flow chart in FIG. 5. When a driver of an object vehicle turns on the headlight system at night, the vehicle detector 11 can judge whether vehicles exist or not in front of the object vehicle in accordance with the image data output from the camera 10. When the vehicle detector 11 judges that the vehicle does not exist, the light-emitting area controller 16 may basically instruct the light distribution controller 17 to emit all the light-emitting devices 23R, 22R, 23L and 22L.

When the vehicle detector 11 judges that at least one vehicle exists, the light-emitting area controller 16 can output the light-emitting area data including a light-emitting area and a non-light-emitting area to the light distribution controller 17 in accordance with the first vehicle data output from the vehicle detector 11. The light distribution controller 17 can output the light-emitting control signal to the optical unit 20R and 20L in accordance with the light-emitting area data output from the light-emitting area controller 16 so as not to emit a glare type light to the at least one vehicle.

In this case, until the light-emitting area controller 16 detects that the vehicle moves, the light distribution controller 17 can keep outputting the above-described light-emitting control signal to the optical unit 20R and 20L. When the light-emitting area controller 16 detects that the vehicle moves, the light-emitting area controller 16 can output new light-emitting area data to the light distribution controller 17 in accordance with a new first vehicle data output from the vehicle detector 11 (Step S11: YES). Next, the circling detector 14 calculates a curvature R of a road, on which the subject vehicle drives, by using the vehicle speed signal and the rudder angle signal output from the subject vehicle (Step S12). The circling detector 14 detects whether the road, on which the subject vehicle drives, is a curved road or not in accordance with the curvature R of the road (Step S13).

When the circling detector 14 judges that the road, on which the subject vehicle drives, is a curved road, the oncoming vehicle detector 13 judges whether the vehicle is an oncoming car or not in accordance with the first vehicle data output from the vehicle detector 11 (Step S14). When the oncoming vehicle detector 13 judges that the vehicle is an oncoming car, the timing controller 15 sets up the first timing factor $\alpha$ and the second timing factor $\beta$, which are shorter time than the normal time Td, and outputs the first timing factor $\alpha$ and the second timing factor $\beta$ to the light distribution controller 17 (Step S15).

When the circling detector 14 judges that the road is a substantially straight road (Step S13: NO) and when the oncoming vehicle detector 13 judges that the vehicle is a forward vehicle forward in a forward direction of the subject vehicle (Step S14: NO), the timing controller 15 store the normal time Td at the first timing factor $\alpha$ and the second timing factor $\beta$ and outputs the first timing factor $\alpha$ and the second timing factor $\beta$, which are set up the normal time Td, to the light distribution controller 17 (Step S16). The light distribution controller 17 outputs the light-emitting control signal to the right and left optical unit 20R and 20L in accordance with the light-emitting area data output from the light-emitting area controller 16 and the first timing factor $\alpha$ and the second timing factor $\beta$ output from the timing controller 15 (Step S17).

Therefore, when the circling detector 14 judges that the road is a substantially straight road and when the oncoming vehicle detector 13 judges that the vehicle is a forward vehicle forward in a forward direction of the subject vehicle, the light distribution controller 17 can enable the optical unit 20R and 20L to vary from a previous light distribution pattern to a new light distribution pattern at intervals of the normal time Td. When the circling detector 14 judges that the road is a curved road and when the oncoming vehicle detector 13 judges that the vehicle is an oncoming vehicle approaching toward the subject vehicle, the light distribution controller 17 can enable the optical unit 20R and 20L to vary from a previous light distribution pattern to a new light distribution pattern at intervals of the first timing factor $\alpha$ at turn-on and the second timing factor $\beta$ at turn-off, which is the same time as the first timing factor $\alpha$ at turn-on.

Figure 6A:
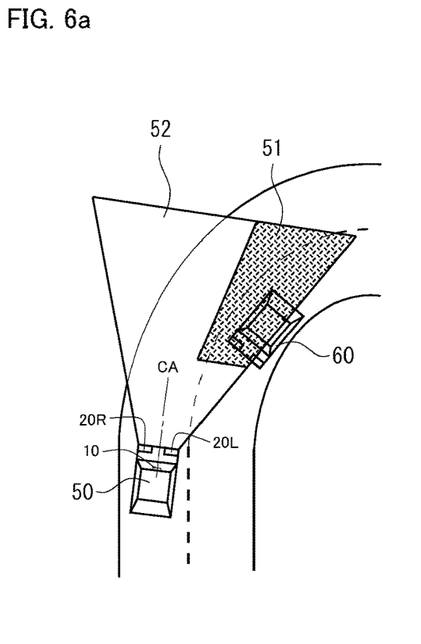
FIG. 6*a* is a schematic top view depicting an exemplary light-emitting performance when an oncoming vehicle approaches on an oncoming lane toward a subject vehicle driving on a driving lane.

FIG. 6a is a first schematic view depicting a light-emitting performance when an oncoming vehicle 60 approaches on an oncoming lane toward a subject vehicle 50 driving on a driving lane. The subject vehicle incorporates the camera 10 having the optical axis CA and the right and left optical unit 20R and 20L as shown in FIG. 6a. In this case, even when the oncoming vehicle 60 rapidly approaches on an oncoming lane toward the subject vehicle, the headlight system including the ADB of the disclosed subject matter can enable the right and left optical unit 20R and 20L to provide a favorable light distribution pattern including a light-emitting area 52 and a non-light-emitting area 51 at once. Accordingly, the headlight system can prevent an emission of a glare type light to the oncoming vehicle 60, and also can provide a favorable light distribution pattern to a driver of the subject vehicle.

Figure 6B:
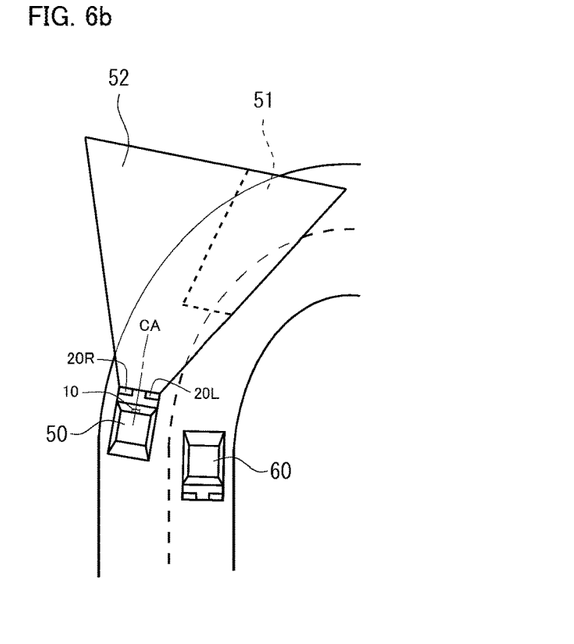
FIG. 6*b* is another schematic top view depicting another exemplary light-emitting performance when the oncoming vehicle passes through the subject vehicle driving on a driving lane.

FIG. 6b is a second schematic depicting a second light-emitting performance when the oncoming vehicle 60 passes through the subject vehicle 50 driving on a driving lane. The headlight system including the ADB can enable the right and left optical unit 20R and 20L to change from the previous favorable light distribution pattern including a light-emitting area 52 and a non-light-emitting area 51 to a new favorable light distribution pattern including a light-emitting area 51 and 52 at once, even when the oncoming vehicle rapidly passes through the subject vehicle. Therefore, the headlight system can prevent an emission of a glare type light to the oncoming vehicle 60, and also can provide the new favorable light distribution pattern to a driver of the subject vehicle because it can change from a non-light-emitting area 51 to a light-emitting area 51 at once.

According to the exemplary vehicle headlight, the exemplary headlight controller can provide a favorable light distribution pattern to safely drive at night while preventing a right and left headlight from emitting a glare type light to oncoming vehicles and vehicles moving forwards in a forward direction of the subject vehicle in accordance with various traffic conditions, even when the subject vehicle drives on a big curved road, and even when an oncoming vehicle rapidly approaches on an oncoming lane toward the subject vehicle and also passes through the subject vehicle.

Furthermore, the right and left optical unit 20R and 20L can be used as the right and left headlight having a high reliability for the headlight controller, and can be easy to reduce a size of the headlight due to no movable part. Thus, the disclosed subject matter can provide vehicle headlight systems using the headlight controller and the optical units can provide a favorable light distribution pattern that can be easy to drive at night for not only the subject vehicle but also vehicles traveling near the subject vehicle by utilizing the characteristics of the headlight controller and the optical unit, and which can expand possibilities for design so as to be able to harmonize with various vehicular designs.

Various modifications of the above disclosed embodiments can be made without departing from the spirit and scope of the presently disclosed subject matter. For example, cases where the right and left optical unit 20R and 20L is used as the right and left headlight including a high beam and a low beam are described. However, the right and left optical unit 20R and 20L is not limited to this structure and can be integrally incorporated into a high beam and a low beam. In addition, cases where each of the first timing factor $\alpha$ and the second timing factor $\beta$ is set up at the normal time and the prescribed time, which is shorter than the normal time, is described as a matter of convenience. However, each of the first timing factor $\alpha$ and the second timing factor $\beta$ is not limited to this procedure and can be set up at a plurality of times as the prescribed time in response to various traffic conditions, and also can be set up at a different plurality of times.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A headlight controller including an adaptive driving beam (ADB) to control a right and left headlight including a plurality of light-emitting chips that can be independently driven and thereby can provide various light distribution patterns including a light-emitting intensity, comprising:
   a camera having an optical axis being located adjacent a subject vehicle having the right and left headlight, configured to photograph at least one vehicle located in a forward direction of the subject vehicle, and the camera being configured to output the at least one vehicle photographed by the camera as image data, each of the right and left headlight providing at least a high beam;
   a vehicle detector detecting the at least one vehicle in accordance with the image data output from the camera, detecting locating data of the at least one vehicle with respect to the optical axis of the camera, and being configured to output said vehicle data as a first vehicle data;
   an oncoming vehicle detector configured to judge whether the vehicle is an oncoming vehicle or not in accordance with the first vehicle data output from the vehicle detector, and configured to output said vehicle data as a second vehicle data;
   a light-emitting area controller determining light-emitting area data including a light-emitting area and a non-light-emitting area for the high beam in accordance with the first vehicle data output from the vehicle detector and the second vehicle data output from the oncoming vehicle detector;
   a circling detector configured to calculate a curvature of a road, on which the subject vehicle drives, by using a vehicle speed signal and a rudder angle signal output from the subject vehicle, configured to judge whether the road is a curved road or a substantially straight road in accordance with the curvature of the road, and configured to output said road data as a vehicle road data;

a timing controller configured to store a first time at a first timing factor and a second timing factor when the road is a substantially straight road in accordance with the vehicle road data output from the circular detector and when the vehicle is not an oncoming vehicle in accordance with the second vehicle data output from the oncoming vehicle detector, configured to store a second time at the first timing factor and the second timing factor when the road is a curved road in accordance with the vehicle road data output from the circling detector and when the vehicle is an oncoming vehicle in accordance with the second vehicle data output from the oncoming vehicle detector, and configured to output the first time or the second time stored at the first timing factor and the second timing factor, wherein each of the first time and the second time is a time while at least one of the light-emitting chips gradually turns on from a turning-off state and another time while at least one of the light-emitting chips gradually turns off from a turning-on state, respectively;

a light-emitting area controller configured to output the light-emitting area data every time the light-emitting area controller detects that the at least one vehicle moves in accordance with the first vehicle data output from the vehicle detector;

a light distribution controller configured to receive the light-emitting area data output from the light-emitting area controller and time data output from the first timing factor and the second timing factor of the timing controller, and configured to output a light-emitting control signal to the right and left headlight of the object vehicle in accordance with the light-emitting area data; and wherein each of a time while the right and left headlight gradually changes from the non-light-emitting area to the light-emitting area and another time while the right and left headlight gradually changes from the light-emitting area to the non-light-emitting area is stored at the first timing factor as the first time and at the second timing factor as the second time, respectively, when the right and left headlight varies the light distribution pattern including the light-emitting area and the non-light-emitting area for only the high beam, and wherein each of the first time and the second time is shorter when the subject vehicle drives on the curved road and the at least one vehicle is the oncoming vehicle than that when the subject vehicle drives on the substantially straight road and/or the at least one vehicle is the oncoming vehicle even when each of the right and left headlight provides only the high beam.

2. The headlight controller including an ADB according to claim 1, wherein each of the first time and the second time stored at the first timing factor and the second timing factor is substantially the same time.

3. The headlight controller including an ADB according to claim 1, wherein the camera is a color camera, which photographs color image data.

4. The headlight controller including an ADB according to claim 1, wherein the oncoming vehicle detector is configured to judge that the vehicle is an oncoming vehicle by extracting a headlight of the oncoming vehicle from the first vehicle data output from the vehicle detector.

5. The headlight controller including an ADB according to claim 1, wherein the circling detector judges that the road, on which the subject vehicle drives, is a curved road, when the curvature of the road is 150 or more.

6. A vehicle headlight system including an ADB, comprising:

a right and left optical unit including a right optical unit and a left optical unit, each of the right and left optical unit including a plurality of white light-emitting diodes (LEDs), and each of the white LEDs independently driven by a right and left drive circuit, respectively;

a camera having an optical axis being located adjacent a subject vehicle having the right and left optical unit, configured to photograph at least one vehicle located in a forward direction of the subject vehicle, and the camera being configured to output the at least one vehicle photographed by the camera as image data, wherein each of the right and left optical unit includes at least one of a first light-emitting device having a first light-emitting surface for a low beam and a second light-emitting device having a second light-emitting surface for a high beam, and an LED drive circuit emitting at least one of the first light-emitting device and the second light-emitting device;

a vehicle detector detecting the at least one vehicle in accordance with the image data output from the camera, detecting locating data of the at least one vehicle with respect to the optical axis of the camera, and being configured to output said vehicle data as a first vehicle data;

an oncoming vehicle detector configured to judge whether the vehicle is an oncoming vehicle or not in accordance with the first vehicle data output from the vehicle detector, and configured to output said vehicle data as a second vehicle data;

a light-emitting area controller determining a light-emitting area data including a light-emitting area and a non-light-emitting area for the high beam in accordance with the first vehicle data output from the vehicle detector and the second vehicle data output from the oncoming vehicle detector;

a circling detector configured to calculate a curvature of a road, on which the subject vehicle drives, by using a vehicle speed signal and a rudder angle signal output from the subject vehicle, configured to judge whether the road is a curved road or a substantially straight road in accordance with the curvature of the road, and configured to output said road data as a vehicle road data;

a timing controller configured to store a first time at a first timing factor and a second timing factor when the road is a substantially straight road in accordance with the vehicle road data output from the circular detector and when the vehicle is not an oncoming vehicle in accordance with the second vehicle data output from the oncoming vehicle detector, configured to store a second time at the first timing factor and the second timing factor when the road is a curved road in accordance with the vehicle road data output from the circling detector and when the vehicle is an oncoming vehicle in accordance with the second vehicle data output from the oncoming vehicle detector, and configured to output the first time or the second time stored at the first timing factor and the second timing factor, wherein each of the first time and the second time is a time while at least one of the light-emitting chips gradually turns on from a turning-off state and another time while at least one of the light-emitting chips gradually turns off from a turning-on state, respectively;

a light-emitting area controller configured to output a light-emitting area data every time the light-emitting area controller detects that the at least one vehicle moves in accordance with the first vehicle data output from the vehicle detector; and a light distribution controller configured to receive the light-emitting area data output from the light-emitting area controller and time data stored at the first timing factor and the second timing factor of the timing controller, and configured to output a light-emitting control signal to the right and left optical unit of the object vehicle in accordance with the light-emitting area data and wherein each of a time while each of the right and left optical unit of the object vehicle gradually changes from a non-light-emitting surface of the second light-emitting surface of the second light-emitting device to a light-emitting surface and is another time while each of the right and left optical unit of the object vehicle gradually changes from a light-emitting surface of the second light-emitting surface of the second light-emitting device to a non-light-emitting surface is stored at the first timing factor as the first time and at the second timing factor as the second time, respectively, and wherein each of the first time and the second time is shorter when the subject vehicle drives on the curved road and the at least one vehicle is the oncoming vehicle than that when the subject vehicle drives on the substantially straight road and/or the at least one vehicle is the oncoming vehicle even when each of the right and left optical unit provides only the high beam.

7. The vehicle headlight system including an ADB according to claim 6, wherein each of the first time and the second time stored at the first timing factor and the second timing factor is substantially the same time.

8. The vehicle headlight system including an ADB according to claim 6, wherein the camera is a color camera, which photographs color image data.

9. The vehicle headlight system including an ADB according to claim 6, wherein the oncoming vehicle detector is configured to judge that the vehicle is an oncoming vehicle by extracting a headlight of the oncoming vehicle from the first vehicle data output from the vehicle detector.

10. The vehicle headlight system including an ADB according to claim 6, wherein the circling detector judges that the road, on which the subject vehicle drives, is a curved road, when the curvature of the road is 150 or more.

11. The vehicle headlight system including an ADB according to claim 6, further comprising:

a first projector lens having an optical axis being located in front of the first light-emitting surface of the first light-emitting device, and the optical axis of the first projector lens intersecting with the first light-emitting surface of the first light-emitting device; and a second projector lens having an optical axis being located in front of the second light-emitting surface of the second light-emitting device, and the optical axis of the second projector lens intersecting with the second light-emitting surface of the second light-emitting device.

12. The vehicle headlight system including an ADB according to claim 6, wherein the first light-emitting device includes at least one white LED aligning in a substantially horizontal direction with reference to the road, on which the subject vehicle drives, and the second light-emitting device includes a plurality of white LEDs arranged in a matrix array shape in a substantially horizontal direction with reference to the road.

13. The vehicle headlight system including an ADB according to claim 12, wherein the first light-emitting device is integrated into the second light-emitting device, and thereby each of the right and left optical unit includes only the second light-emitting device without the first light-emitting device.

14. The vehicle headlight system including an ADB according to 12, wherein the first time is longer than the second time, which is stored at the first timing factor and the second timing factor.

15. A headlight controller including an adaptive driving beam (ADB) to control a right and left headlight including a plurality of light-emitting chips that may be independently driven, comprising:

a vehicle detector detecting the at least one vehicle in accordance with image data output from a camera, detecting locating data of the at least one vehicle located in a forward direction of a subject vehicle incorporating the camera, and being configured to output said vehicle data as a first vehicle data;

a light-emitting area controller determining light-emitting area data including a light-emitting area and a non-light-emitting area for the high beam, the non-light-emitting area determined in accordance with the first vehicle data output from the vehicle detector, and the light-emitting area controller determining the light-emitting area except for the non-light-emitting area in the light-emitting area data;

a timing controller configured to store a first time at a first timing factor and a second timing factor when the road is a substantially straight road and when the vehicle is not an oncoming vehicle, configured to store a second time at the first timing factor and the second timing factor when the road is a curved road and when the vehicle is an oncoming vehicle, wherein the timing controller sets up the first time and the second time so that the first time is longer than the second time;

a light-emitting area controller configured to output the light-emitting area data every time the light-emitting area controller detects that the at least one vehicle moves in accordance with the first vehicle data output from the vehicle detector;

a light distribution controller configured to receive the light-emitting area data output from the light-emitting area controller, and configured to receive the first time and the second time output from the first timing factor and the second timing factor of the timing controller; and wherein the first time is a time while the right and left headlight changes from the non-light-emitting area to the light-emitting area, and the second time is another time while the right and left headlight changes from the light-emitting area to the non-light-emitting area.

* * * * *